United States Patent
Ittelson et al.

(10) Patent No.: US 12,537,709 B2
(45) Date of Patent: Jan. 27, 2026

(54) INSTANT REPLAY FOR VIDEO CONFERENCES

(71) Applicant: Zoom Video Communications, Inc., San Jose, CA (US)

(72) Inventors: Brendan James Ittelson, San Jose, CA (US); Timothy Slagle, Boiling Springs, SC (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/105,411

(22) Filed: Feb. 3, 2023

(65) Prior Publication Data
US 2024/0267245 A1 Aug. 8, 2024

(51) Int. Cl.
*H04L 12/18* (2006.01)

(52) U.S. Cl.
CPC ...... *H04L 12/1831* (2013.01); *H04L 12/1822* (2013.01)

(58) Field of Classification Search
CPC .................. H04L 12/1831; H04L 12/1822
See application file for complete search history.

(56) References Cited

U.S. PATENT DOCUMENTS

| | | | |
|---|---|---|---|
| 8,456,507 B1 * | 6/2013 | Mallappa | H04N 7/152 379/202.01 |
| 10,250,661 B2 * | 4/2019 | Totzke | H04L 65/1094 |
| 10,819,855 B2 * | 10/2020 | Herrin | H04M 3/42221 |
| 11,558,213 B1 * | 1/2023 | McHugh | G11B 20/10527 |
| 2009/0319916 A1 * | 12/2009 | Gudipaty | H04N 7/15 715/753 |
| 2020/0259673 A1 * | 8/2020 | Aono | H04L 12/1827 |
| 2022/0239516 A1 * | 7/2022 | Iyer | H04L 12/1831 |
| 2022/0303152 A1 * | 9/2022 | Norton, Jr. | H04N 7/147 |

* cited by examiner

*Primary Examiner* — Raqiul A Choudhury
(74) *Attorney, Agent, or Firm* — Kilpatrick Townsend & Stockton LLP

(57) ABSTRACT

Techniques for instant replay in virtual meetings are disclosed. In an example, a method involves receiving, by a virtual conference provider from a first client device of a set of client devices connected to a virtual meeting, a request for a replay segment from a second client device. The method further involves transmitting the request for the replay segment to the second client device during the virtual meeting. The method further involves receiving replay segment data from the second client device during the virtual meeting. The replay segment data includes data recorded by the second client device during the virtual meeting. The method further involves transmitting the replay segment data to the first client device.

21 Claims, 9 Drawing Sheets

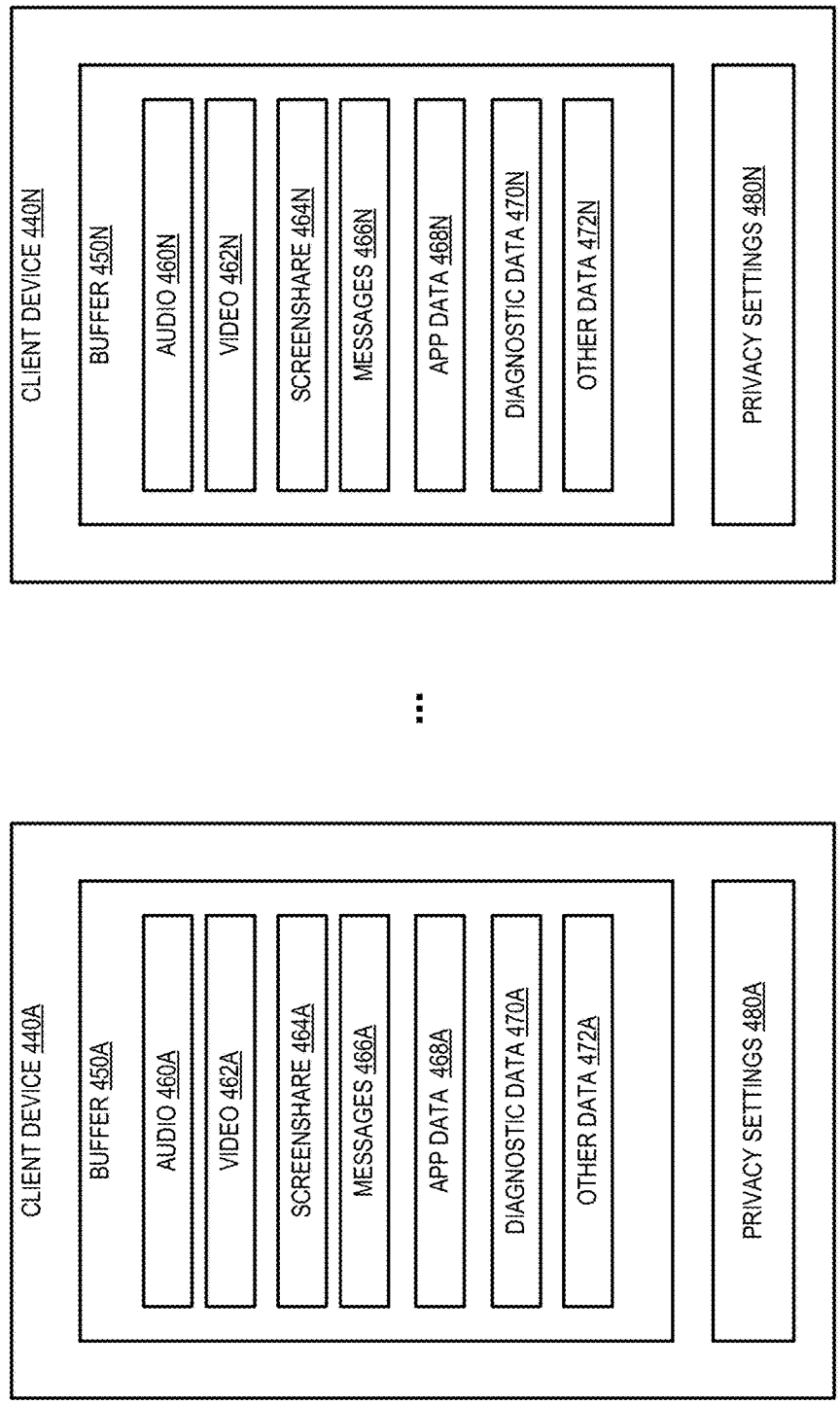

500

502 — ESTABLISHING, VIA A VIRTUAL CONFERENCE PROVIDER, A VIRTUAL MEETING AND JOINING A SET OF CLIENT DEVICES TO THE VIRTUAL MEETING, EACH CLIENT DEVICE ASSOCIATED WITH A CORRESPONDING PARTICIPANT.

504 — RECEIVING, FROM ONE OR MORE OF THE CLIENT DEVICES, REPLAY OPT-IN INFORMATION FOR PARTICIPANTS IN THE MEETING.

506 — RECEIVING, BY THE VIRTUAL CONFERENCE PROVIDER FROM A FIRST CLIENT DEVICE OF THE SET OF CLIENT DEVICES, A REQUEST FOR A REPLAY SEGMENT FROM A SECOND CLIENT DEVICE OF THE SET OF CLIENT DEVICES.

508 — DETERMINING, FROM THE SET OF CLIENT DEVICES, ONE OR MORE CLIENT DEVICES THAT HAVE OPTED-IN TO THE REPLAY SEGMENT FEATURE.

510 — TRANSMITTING, DURING THE VIRTUAL MEETING AND TO THE ONE OR MORE CLIENT DEVICES THAT HAVE OPTED-IN, THE REQUEST FOR THE REPLAY SEGMENT.

512 — RECEIVING, FROM THE ONE OR MORE CLIENT DEVICES DURING THE VIRTUAL MEETING, REPLAY SEGMENT DATA FROM THE RESPECTIVE CLIENT DEVICE, THE REPLAY SEGMENT DATA INCLUDING DATA RECORDED BY THE RESPECTIVE CLIENT DEVICE DURING THE VIRTUAL MEETING.

514 — TRANSMITTING, TO THE FIRST CLIENT DEVICE, THE REPLAY SEGMENT DATA.

*FIG. 5*

INSTANT REPLAY FOR VIDEO CONFERENCES

FIELD

This disclosure generally relates to video conferencing. More specifically, but not by way of limitation, this disclosure relates to instant replay of segments of video conferences.

BRIEF DESCRIPTION OF THE DRAWINGS

FIG. 4 depicts an example system for providing instant replay in video conferences.

FIG. 5 depicts a flowchart of an example of a method for providing instant replay in video conferences.

DETAILED DESCRIPTION

Figure 1:
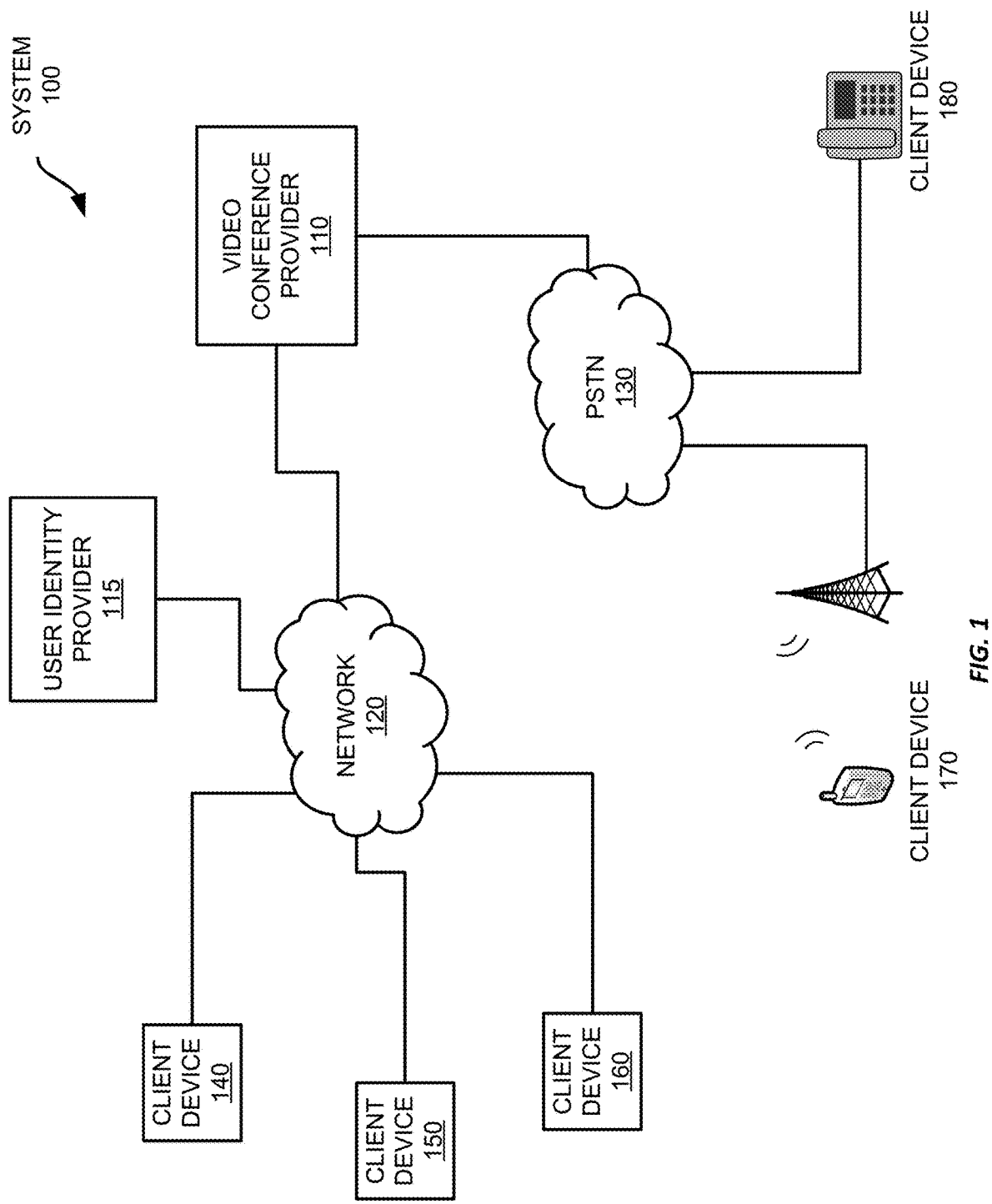
FIG. 1 depicts an example system for providing videoconferencing functionality to client devices.

Disclosed techniques relate to instant replay of segments of video conferences and virtual meetings. Instant replay involves replaying segments, or short moments, of conferences such as a short clip of audio or video. Video conferences and virtual meetings are in widespread use in businesses, schools, and by individuals. Often, during a meeting, interesting or notable moments arise such as a perfect delivery of a message. Other times, a difficult topic is not quite understood when first stated. In these situations, and others, a replay of a moment or segment of the meeting is helpful.

But during conferences, a replay is typically not possible. For instance, given privacy concerns and logistics, many meetings are not recorded, rendering instant replay impossible. Other meetings are recorded, but the recording is not available until after the meeting is completed and scrubbing through a long recording to find the desired part of the meeting is arduous and time consuming. Moreover, for legal reasons, users are typically required to consent to any recording of a video conference.

Disclosed techniques address privacy concerns by maintaining, on each client device, a dedicated buffer that stores only conference data (e.g., audio, video) that originated from the corresponding conference device. This conference data can be used to provide instant replays, assuming the corresponding conference device has consented. For example, a meeting buffer on a first device only stores audio and video that originated from the first device, i.e., was produced by the user of the first device, and not from other devices. In this manner, privacy is maintained. When an instant replay is requested, the conference system generates a replay of conference data from only the participants who have consented. The instant replay can then be replayed to one or more devices in the conference.

The following non-limiting example is introduced for discussion purposes. A conference is established, via a conference provider, between three client devices. Each device has a corresponding participant. Before the conference starts, each client device prompts the corresponding user to consent or "opt-in" to the instant replay feature. Users of a first device and a second device opt-in but a user of a third device declines to participate in the instant replay feature. The meeting commences and to maintain user privacy, a replay buffer of conference data is recorded on each individual client device that has opted into recording. Therefore, the first and second devices each maintain a replay buffer, but the third device does not.

Continuing the example, the first user later requests an instant replay. The first device sends a request for a replay segment to the conference provider, which determines which client devices have opted-into the instant replay functionality and then relays the request to the second device, but not the third device. The second device transmits, back to the conference provider, a replay segment that includes data recorded by the second device. The conference provider then provides the replay segment data to the first device, which can then play back the segment as desired. As discussed, the third device does not share any conference data.

Disclosed techniques offer several advantages. For instance, by maintaining one or more buffers during a video conference, real-time instant replays during a meeting as compared to having to replay of scrub through a recording of an entire meeting. Additionally, disclosed techniques permit each person to control whether they provide instant replays. Thus, each individual is in control of their own video stream. Further, disclosed techniques reduce a burden on the virtual conference provider, because the instant replay recordings occur on local client devices.

Turning now to the Figures, FIG. 1 depicts an example system 100 for providing videoconferencing functionality to client devices. In the example depicted by system 100, video conference provider 110 hosts one or more video conferences between client devices 140-180. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Other configurations include a hybrid model in which a video conference provider 110 may supply components to enable a private organization to host private internal video conferences or to connect its system to the video conference provider 110 over a public network.

System 100 optionally includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
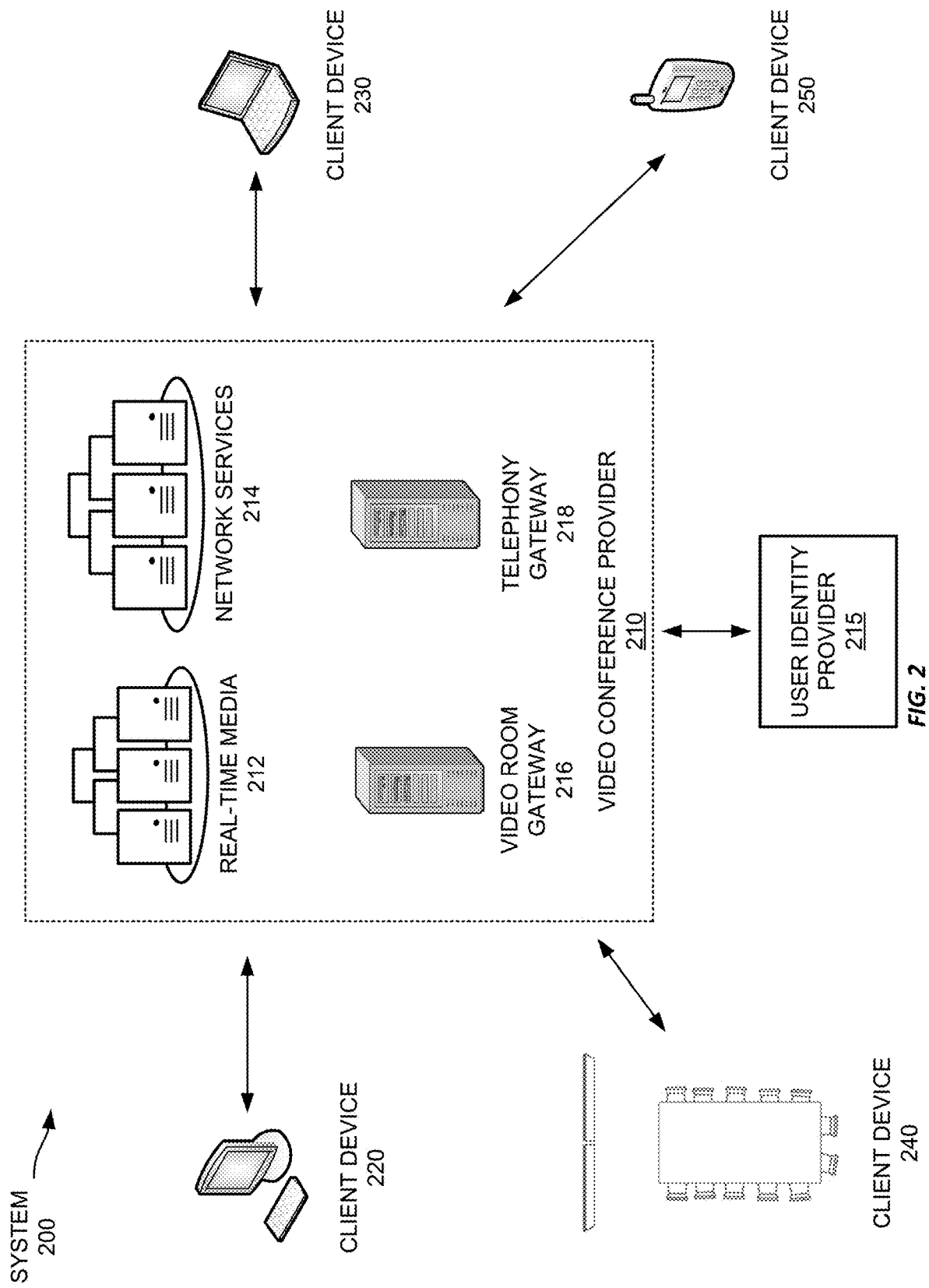
FIG. 2 depicts an example system in which a video conference provider provides videoconferencing functionality to various client devices.

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, generating summaries and translations from meeting audio, manage user functionality in the meetings, enable text messaging during the meetings, create and manage breakout rooms from the main meeting, etc. FIG. 2, described below, provides a more detailed description of the architecture and functionality of the video conference provider 110. It should be understood that the term "meeting" encompasses the term "webinar" used herein.

Meetings facilitated by video conference provider 110 are provided in virtual rooms to which participants are connected. A room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "a sidebar meeting." A sidebar meeting as provided herein may be a "room" that is associated with a "main" videoconference room or "main meeting."

To create a meeting with the video conference provider 110, a user may contact the video conference provider 110 using a client device 140-180 and select an option to create a new meeting. Such an option may be provided in a webpage accessed by a client device 140-180 or client application executed by a client device 140-180. For telephony devices, the user may be presented with an audio menu that they may navigate by pressing numeric buttons on their telephony device.

To create a meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140-180 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as communication network 120 or the public switched telephone network ("PSTN") 130. The client devices 140-180 may be any suitable computing or communications device that have audio or video capability. For example, client devices 140-180 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Client devices 140-160 contact the video conference provider 110 using communication network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text messaging with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

FIG. 2 depicts an example system 200 in which a video conference provider 210 provides videoconferencing functionality to various client devices 220-250. The client devices 220-250 include two conventional computing devices 220-230, dedicated equipment for a video conference room 240, and a telephony device 250.

Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs different servers (or groups of servers) to provide video conference functionality. The video conference provider 210 uses one or more real-time media servers 212, one or more network services servers 214, one or more video room gateways 216, and one or more telephony gateway servers 218. Each of these servers 212-218 is connected to one or more communications networks to enable them to collectively provide access to and participation in one or more video conference meetings to the client devices 220-250.

Real-time media servers 212 provide multiplexed multimedia streams to meeting participants, such as client devices 220-250. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex the video from client device 220 and audio feeds when transmitting streams to client device 220. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via real-time media servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference provider 210 and across many different real-time media servers 212.

Network services servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client device 220 and provide a meeting ID and passcode. The network services server 214 may use the meeting ID to identify an upcoming or on-going meeting and verify the passcode is correct for the meeting ID. After doing so, the network services servers 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services servers 214 may accept requests to join the meeting from various users.

To handle requests to join a meeting, the network services servers 214 may receive meeting information, such as a meeting ID and passcode, from one or more client devices 220-250. The network services servers 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services servers 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services servers 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services servers 214.

After joining a meeting, client devices will send and receive multimedia streams via the real-time media servers 212, but they may also communicate with the network services servers 214 as needed during meetings. For example, if the meeting host leaves the meeting, the network services servers 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services servers 214.

For example, if a host wishes to remove a user from a meeting, they may identify the user and issue a command through a user interface on their client device. The command may be sent to a network services server 214, which may then disconnect the identified user from the corresponding real-time media server 212.

In addition to creating and administering on-going meetings, the network services servers 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services servers 214 may deny the request.

Depending on the functionality provided by the video conference provider, the network services servers 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these video room gateway servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway servers 216 when dedicated video conferencing hardware connects to it, such as device ID information, subscriber information, hardware capabilities, hardware version information etc. Upon receiving such information and authenticating the dedicated video conferencing hardware, the video room gateway servers 216 may interact with the network services servers 214 and real-time media servers 212 to allow the video conferencing hardware to create or join meetings hosted by the video conference provider 210.

The telephony gateway servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
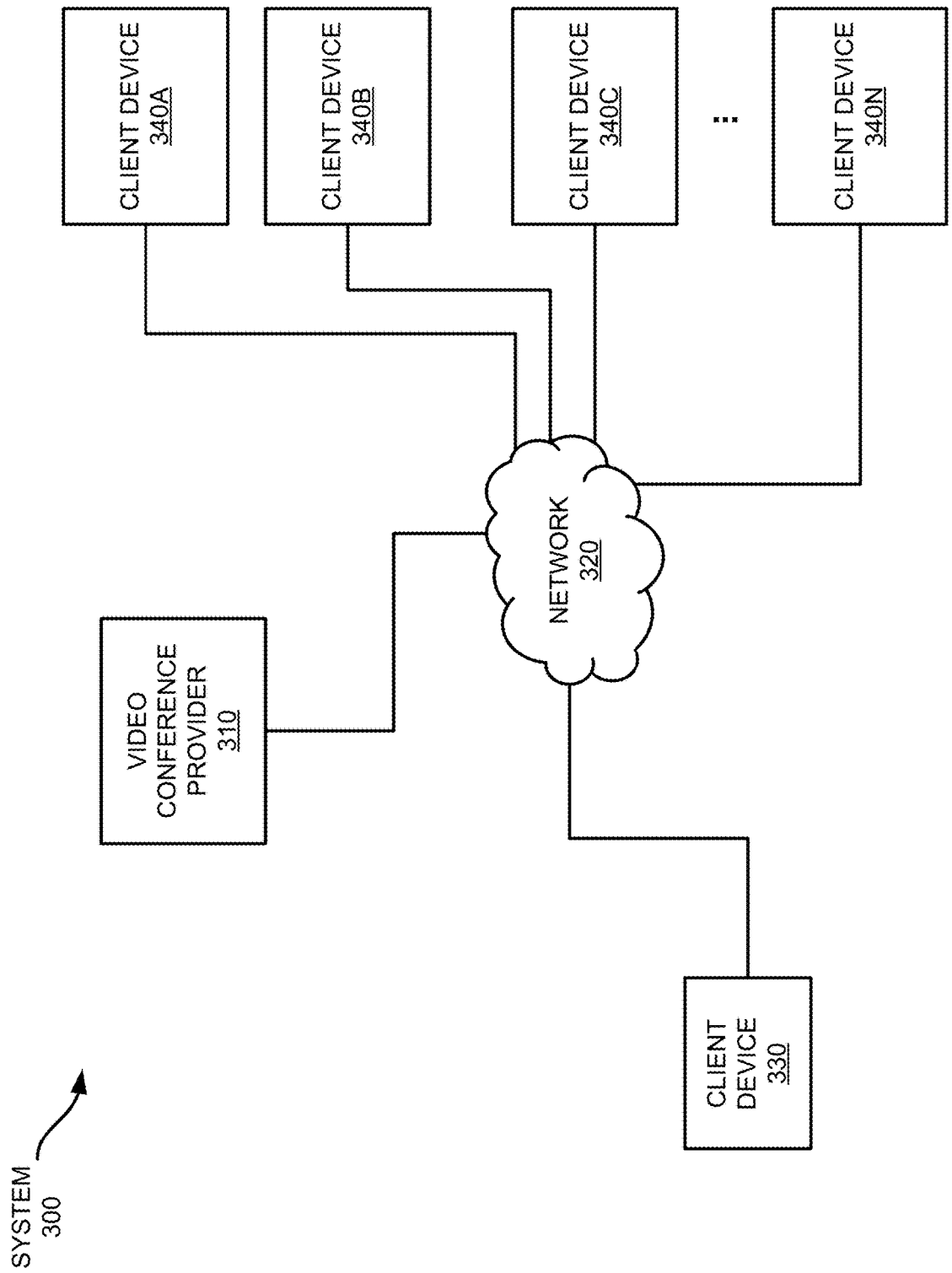
FIG. 3 depicts an example system for providing instant replay in video conferences.

FIG. 3 depicts an example system 300 for providing instant replay in video conferences. The system 300 shown in FIG. 3 includes a video conference provider 310 and multiple client devices 330 and 340A-N that are connected to the video conference provider 310 via network 320. In this example, the network 320 is the internet; however, any communications network or combination of communications networks may be employed. While system 300 is depicted as including multiple client device 330, 340A-N, it should be appreciated that some systems may not include any client devices at any particular time, and that the number of client devices can change.

To start a video conference, client device 330, a host, connects to the video conference provider 310 and begins a main meeting ("meeting") at the video conference provider 310, such as by beginning a scheduled meeting, generally as described above with respect to FIGS. 1 and 2. The video conference provider 310 may create and manage the meeting as discussed above with respect to FIGS. 1-2. Any of client devices 330 or 340A-N may start or join additional meetings.

Video conference provider 310 and/or one or more client devices 330 and 340A-N can facilitate instant replay functionality. Instant replay functionality includes obtaining consent from participants in the meeting regarding whether they wish to opt-in to the replay functionality. For any participants who opt-in to the replay functionality, their client devices privately store a limited buffer of recent audio or video data, such as is captured by their camera and microphone. Such an approach maintains the participants' privacy by storing replay data in local buffers on individual client devices. Then, when a replay is requested, the buffer data is accessed and consent obtained, if not already obtained, for example at the start of the meeting. These buffers are not available for other to access, except if a request for replay is sent. To further enhance privacy, the replay buffer may be stored in volatile memory such that if the client device loses power, the replay buffer is deleted.

When requested, replay data can be obtained from the buffers on client devices whose users have opted-in to the replay functionality. In some cases, the video conference provider 310 does not know which devices consented for instant replay and if so, whether a buffer has been enabled on the respective client device. As such, in some cases, the video conference provider 310 obtains this information after a request for an instant replay has been made.

The replay data can be combined into a single replay segment in some cases, such as by resizing and merging video feeds into a single video stream. Though in some cases, replay from each participant can be separately provided to the requesting participant or others within the meeting. In this example, the replay buffers are circular buffers, but any suitable data structure can be used. For instance, a buffer can represent the last minute of conference data and be constantly refreshed as the conference progresses. Examples of replay data include, but are not limited to, video, audio, screensharing, chat messages between participants, diagnostic data (e.g., network info), and/or data representing anything that is shared in the conference.

Various durations and starting points of replay segments are possible. For instance, a segment could be 30 seconds long and include conference data from 30 seconds prior to the point in the conference at which the replay was requested. A segment could be 45 seconds long and start two minutes prior to the point at which replay was requested. Accordingly in some cases, a request for an instant replay can include a duration of the instant replay (e.g., 30 seconds) and/or a starting point (e.g., 1 minute prior or 5 minutes prior).

In a simplified example, client devices 340A-C join a conference hosted by video conference provider 310. At the outset of the conference, each client device 340A-C consents to recording their respective data streams for the instant replay functionality. The client devices 340A-C maintain respective buffers that store conference data corresponding to the respective client device, e.g., shared by or generated by the participant using the respective client device.

Continuing the example, at some point during the conference, client device 340B requests an instant replay by sending the request to the video conference provider 310. In turn, video conference provider 310 transmits individual requests for replay data to each of the client devices that opted-in to the replay functionality, which in this case includes client devices 340A-C. Each client device 340A-C then provides respective replay data, which can include audio, video, or any other conference data, back to the video conference provider 310. In turn, the video conference provider 310 combines the replay data into a combined replay segment that reflects the replay data from all the client devices 340A-C. Then, the instant replay segment can be replayed on one or more of the devices, or within the conference, for all client devices to view. The instant replay segment can also be downloaded (e.g., by a user) or stored for later use or otherwise made available during or after a meeting (e.g., by the conference provider). And while this example involves combining the replay data received from the various client devices 340A-C, in some examples, the video conference provider provides the replay data from the various clients to the requesting client without combining them.

As discussed, client devices that have consented can provide replay data for the instant replay. For instance, if client devices 340A-B join a conference via video conference provider 310, but only client device 340A opts into the instant replay feature, then instant replay of conference data generated by both client devices 340A-B is not possible, because in this case, only client device 340A has opted-in and therefore, only client device 340A maintains a replay buffer for conference data. However, during the conference, the user of client device 340B can request an instant replay. Client device 340B sends a request to the conference provider, which relays the request to the client device 340A. Client device 340A transmits a replay segment back to the video conference provider 310, which in turn, provides the replay segment data to the client device 340B. The user of client device 340B can then play back the segment as desired. But in this example, a user of client device 340A cannot obtain replay data from client device 340B, as client device 340B did not consent and therefore did not maintain a replay buffer.

Other use cases and configurations are possible. In some cases, video conference provider 310 need not be involved in the instant replay. Rather, requests for a replay and segment data can be passed directly from client device to client device.

In some cases, more complex privacy policies can be used such as a global opt-in or opt-out to instant replay for a given device. For example, corporate policies may require the use of replay functionality or may prohibit the use of replay functionality. More fine-grained control may be employed in some examples as well. For example, a corporate replay policy may allow replay of audio or video streams, but not streams of shared content such as presentations or documents. Some examples may prohibit certain persons from enabling replay functionality on their client device, such as executive-level employees, human resources employees, or employees in financial teams. Still other policies may be implemented according to different examples.

Different buffer storage configurations and the storage of local privacy settings are possible, as explained further with respect to FIG. 4. Operations performed by a conference provider are explained further with respect to FIG. 5. Operations performed by a client device are explained further with respect to FIG. 6. Examples of signal flows between devices are explained further with respect to FIG. 7. An example user interface for requesting instant replay is explained further with respect to FIG. 8.

FIG. 4 depicts an example system 400 for providing instant replay in video conferences. System 400 depicts client devices 440A-N having various buffers and privacy settings. FIG. 4 illustrates examples of buffers that can be present on a client device, e.g., client devices 340A-N, and privacy settings that can be present on a client device and maintained differently relative to other client devices. The buffers are used to store applicable conference data generated by the respective client device. The privacy settings are used to determine whether a device has opted-in or opted-out of instant replay, and/or whether any global privacy policies are in place.

As can be seen, client devices 440A-N can include buffers with different contents and/or privacy settings. The buffers can store replay data such as audio, video, and so forth. Different length buffers are possible. In some cases, an entire conference can be buffered. Buffers can also be encrypted to provide further privacy protection. Buffers can be deleted after the conclusion of a video conference and/or when the video conferencing application is exited.

As depicted, client device 440A includes buffer 450A and privacy settings 480A. Buffer 450A includes audio 460A, video 462A, screen share data 464A, messages 466A, app data 468A, diagnostic data 470A, and other data 472A. But any data that represents a state of the conference during the relevant time period can be stored. Further, video and audio can be stored together, e.g., multiplexed, or stored separately. Screen share data 464A stores data that represents any screen sharing that took place during the time represented by the buffer. App data 468A can include data related to the applications in use during the time represented by the buffer. Diagnostic data 470A can include any kind of data used for diagnostics related to the conference, the instant replay feature, or the client devices. Other data 472A includes any other relevant data. Similarly, client device 340N includes buffer 450N and privacy settings 480N, and so forth.

In some cases, buffering can take place on video conference provider 310. In this case, the video conference provider 310 stores a buffer of conference data for each client device 340A-N that has consented to the replay functionality.

FIG. 5 depicts a flowchart of an example of a method for providing instant replay in video conferences. Method 500 can be implemented by one or more of video conference provider 310, client devices 340A-N, or any other suitable systems.

It should be appreciated that method 500 provides a particular method for instant replay in video conferences. Other sequences of operations may also be performed according to alternative examples. For example, alternative examples may perform the steps outlined above in a different order. Moreover, the individual operations illustrated by method 500 may include multiple sub-operations that may be performed in various sequences as appropriate to the individual operation. Furthermore, additional operations may be added or removed depending on the particular applications. Further, the operations described in method 500 may be performed by different devices.

For example purposes, FIG. 5 is discussed with respect to the devices of FIG. 3. In the example described below, two client devices, client devices 340A-B are present in a conference. In other examples, additional client devices can join the conference.

At block 502, method 500 involves establishing, via a virtual conference provider, a virtual meeting and joining a set of client devices to the virtual meeting, each client device associated with a corresponding participant. For example, referring back to FIG. 3, video conference provider 310 establishes a virtual meeting between client devices 340A-N. Each client device 340A-N is associated with a corresponding participant.

At block 504, method 500 involves receiving, from one or more of the client devices, replay opt-in information for participants in the meeting. At the outset of the meeting, client devices 340A-N can each transmit their respective instant replay opt-in or out-out preferences to video conference provider 310, which can maintain a record of these preferences.

Different methods of obtaining privacy consents are possible. For example, consent can be obtained from client devices prior to a conference commencing or during a conference when a replay is requested. In some cases, the video conference provider 310 and/or client devices 340A-N can determine which client devices were active during the requested replay segment. Then, obtaining consent can be limited to the devices that were active during the requested segment, which simplifies the user experience. Various techniques can be used to make this determination such as analyzing video for movement and/or detection of audio in the audio streams from conference devices.

Consent can be retrieved from a previously stored selection or privacy policy. For instance, a given client device can opt in or opt out of instant replay for all meetings. In some cases, a given device can opt in or opt out of certain meetings based on a type of meeting. For example, a device may have a predetermined opt-in for instant replay of work meetings but not for meetings designated as personal. Similar distinctions could be made for internal meetings versus external meetings. Further, globally applied policies can affect one or more client devices such as restricting recording, requiring recording, or requiring separate consent for each meetings. If consent is granted for recording of meetings, then consent can be automatically granted for instant replay.

At block 506, method 500 involves receiving, by the virtual conference provider from a first client device of the set of client devices, a request for a replay segment from a second client device of the set of client devices. Continuing the example, video conference provider 310 receives, from a first client device, client device 340A, a request for the replay segment from the second client device.

At block 508, method 500 involves determining, from the set of client devices, one or more client devices that have opted-in to the instant replay functionality. Continuing the example, client device 340B has opted into the instant replay functionality. Video conference provider 310 can determine that client device 340B has opted in by accessing the record of preferences, as discussed with respect to block 504.

As discussed further herein, consent to participate in the instant replay feature can be can be obtained at one or more points during or before the conference such as before the conference begins, when a party requests an instant replay, and globally, e.g., from a predefined consent previously obtained and stored on a client device or at the conference provider.

At block 510, method 500 involves transmitting, during the virtual meeting and to the one or more client devices that have opted into the replay functionality, the request for the replay segment. Continuing the example, video conference provider 310 transmits the request to a second client device, client device 340B.

If the client device that requested the replay, e.g., client device 340A in this example, is only be interested in a replay from specific devices, then the request for replay is provided only to those specified devices. Advantages to this approach include reducing latency in obtaining the replay.

At block 512, method 500 involves receiving, from the one or more client devices that have opted into the replay functionality, replay segment data from the respective client device, the replay segment data including data recorded by the respective client device during the virtual meeting. Continuing the example, client device 340B obtains the replay segment data from a buffer on client device 340B and transmits the replay segment data to video conference provider 310. Similarly, other client devices that have opted-in transmit replay segment data to the video conference provider 310.

At block 514, method 500 involves transmitting, to the first client device, the replay segment data. Continuing the example, video conference provider 310 transmits the replay segment data to client device 340A. If more client devices are providing segment data, then video conference provider 310 can combine the segment data into a combined segment. As discussed, in some cases, client device 340B could transmit the segment data to client device 340A directly.

Figure 6:
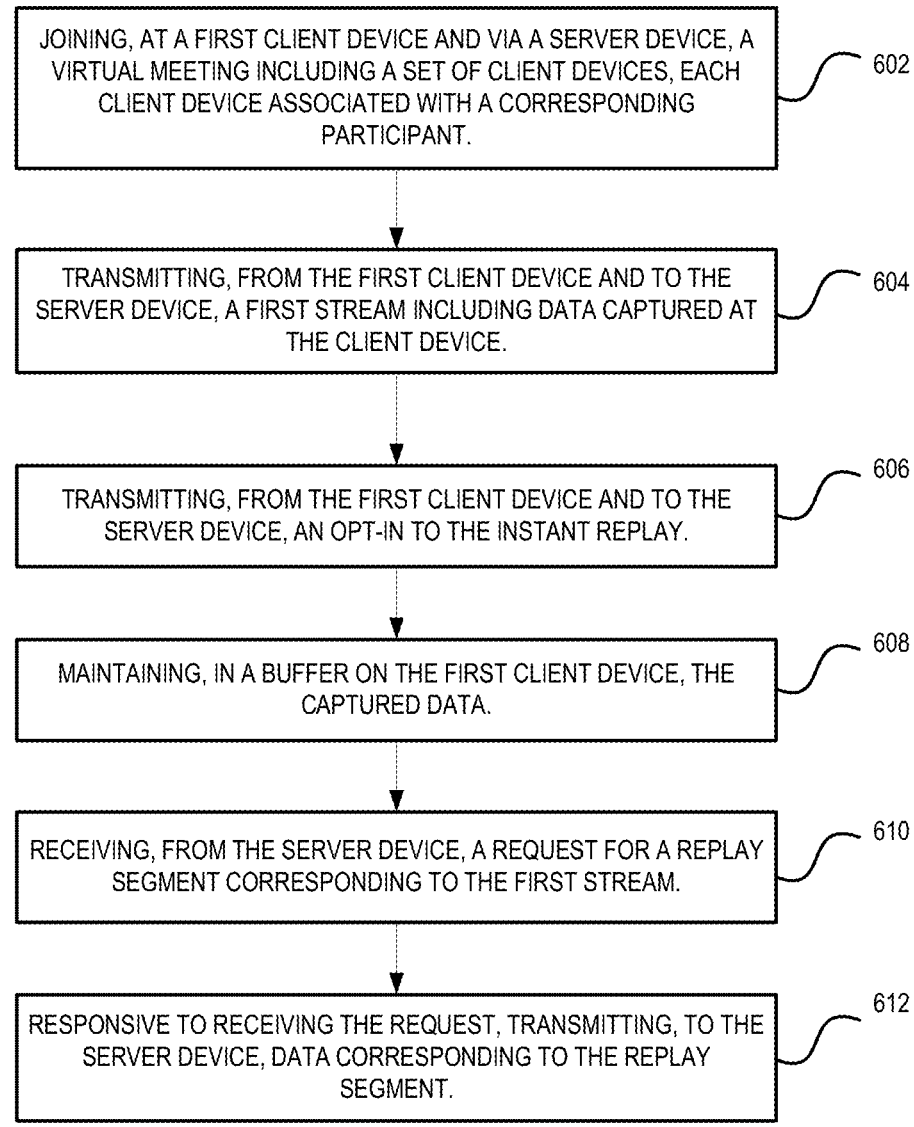
FIG. 6 depicts a flowchart of an example of a method for providing instant replay in video conferences.

FIG. 6 depicts a flowchart of an example of a method 600 for providing instant replay in video conferences. Method 600 can be implemented by client devices 340A-N or by any suitable client devices according to this disclosure.

It should be appreciated that method 600 provides a particular method for instant replay in video conferences. Other sequences of operations may also be performed according to alternative examples. For example, alternative examples may perform the steps outlined above in a different order. Moreover, the individual operations illustrated by method 600 may include multiple sub-operations that may be performed in various sequences as appropriate to the individual operation. Furthermore, additional operations may be added or removed depending on the particular applications. Further, the operations described in method 600 may be performed by different devices.

At block 602, method 600 involves joining, at a first client device and via a server device, a virtual meeting including a set of client devices, each client device associated with a corresponding participant. For example, referring back to FIG. 3, one or more client devices 340A-N join a virtual meeting via video conference provider 310. Consent from participating devices can be obtained prior to the start of the virtual meeting or prior to the respective client device joining the virtual meeting.

At block 604, method 600 involves transmitting, from the first client device and to the server device, a first stream including data captured at the client device. Continuing the example, client device 340A transmits, to the video conference provider 310, the first stream that includes conference data captured at client device 340A. Other client devices 340B-N, if present in the conference, can perform similar operations.

At block 606, method 600 involves transmitting, from the first client device and to the server device, an opt-in to instant replay. Continuing the example, client device 340B transmits, to the video conference provider 310, an opt-in to instant replay. Other client devices 340A and 340C-N can transmit an opt-in preference also, as appropriate. If opt-in is not granted, then method 600 ceases to execute on client device 340B. Execution can continue on other devices that have opted-in.

At block 608, method 600 involves maintaining, in a buffer on the first client device, the captured data. Client device 340A maintains a local buffer that stores conference data such as video and audio. Similarly, other client devices 340B-N, if present in the conference, can maintain buffers as well.

At block 610, method 600 involves receiving, from the server device, a request for a replay segment corresponding to the first stream. A request can include a duration and/or a and starting point of a replay segment. Examples include a segment duration of 1 minute, or a segment starting point of two minutes ago with a length of 30 seconds.

Continuing the example, client device 340A transmits a request for a replay segment to video conference provider 310. Client device 340B then receives the request from video conference provider 310.

At block 612, method 600 involves, responsive to receiving the request, transmitting, to the server device, data corresponding to the replay segment. Client device 340B obtains the data from the buffer stored on client device 340B, then transmits the data from the buffer that corresponds to the segment back to video conference provider 310.

If multiple client devices 340A-N are participating in the conference, each client device that has opted in performs similar functions as described above with respect to blocks 608 and 610.

Figure 7:
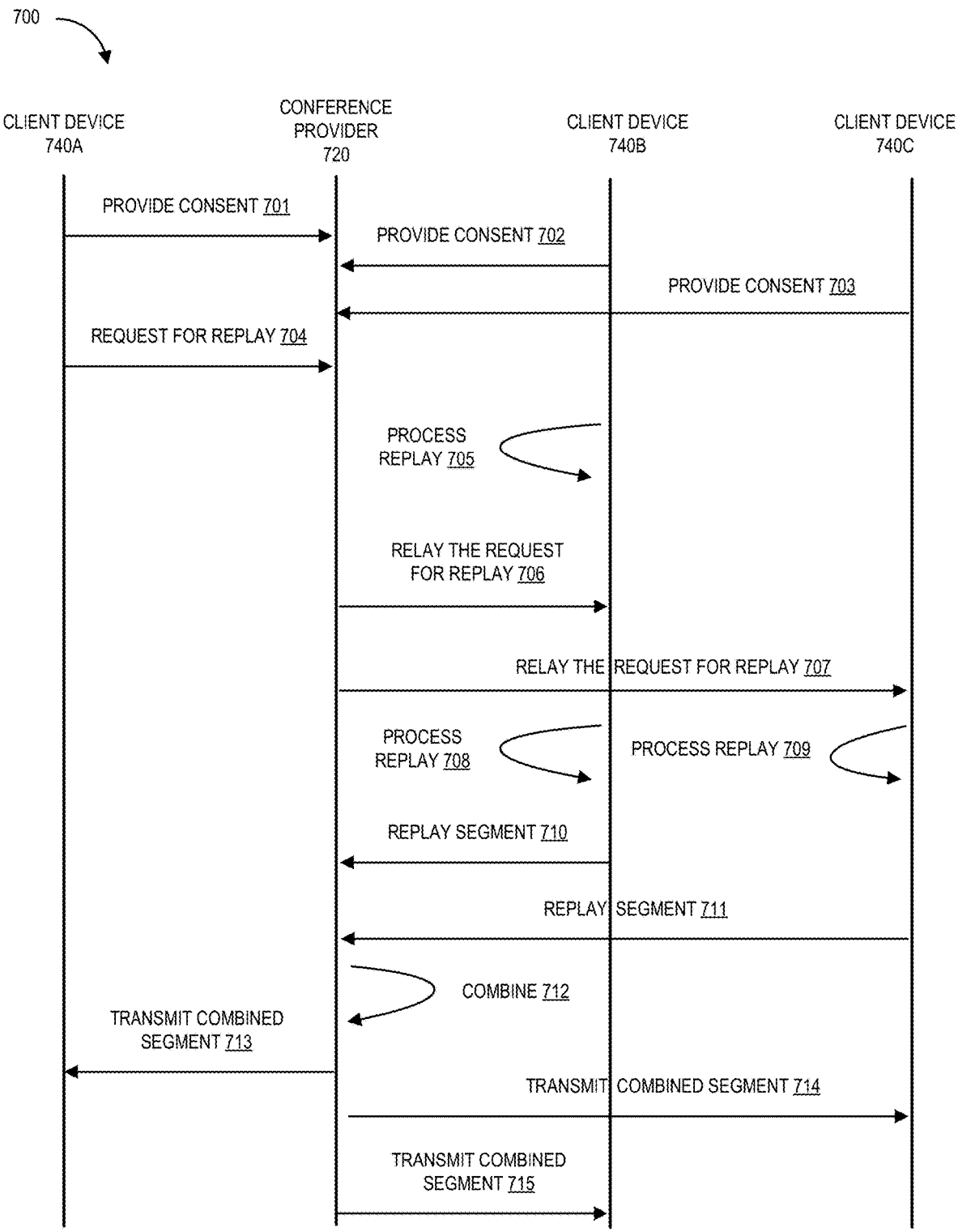
FIG. 7 depicts an example of a sequence of events for providing instant replay in video conferences.

FIG. 7 depicts an example of a sequence of events 700 for providing instant replay in video conferences. Sequence of events 700 includes events that occur between client device 740A-C and conference provider 720. Sequence of events 700 indicates events that can occur between three client devices, each of which have opted into the instant replay feature and are each maintaining local buffers. But it will be appreciated that sequence of events 700 is merely one example and other examples are possible. For illustrative purposes, sequence of events 700 is discussed with respect to methods 500 and 600.

At event 701-713, client devices 740A-C, respectively provide consent (opt-in) to the instant replay feature.

At event 704, client device 740A transmits a request for replay to conference provider 720, for example, generally as discussed with respect to block 510. The request for replay can optionally include a duration and/or starting point within the conference. Conference provider 720 then receives the request.

At event 705, conference provider 720 processes the request. Processing the request can include checking which, if any, client devices have opted-in or verifying other policies such as global policies.

At event 706, conference provider 720 relays the request to client device 740B, generally as discussed with respect to block 510.

At event 707, conference provider 720 relays the request to client device 740B, generally as discussed with respect to block 510.

At event 708, client device 740B processes the replay request. Processing can include obtaining the conference data from the buffer stored on client device 740B, based on the duration and/or starting point, if specified by client device 740A.

At event 709, client device 740C processes the replay request, similarly as performed at event 708.

At event 710, conference provider 720 receives replay segment data from client device 740B, generally as discussed with respect to blocks 512 and 612.

At event 711, conference provider 720 receives replay segment data from client device 740C, generally as discussed with respect to blocks 512 and 612.

At event 712, conference provider 720 combines the replay segment data from client devices 740B-C. In this manner, the resulting segment includes conference data from both client devices 740B-C.

At events 713-715, conference provider 720 provides the combined segment generated at event 708 to client devices 740A-C respectively.

Events 712-715 are optional. In some cases, a combined segment is not generated, and instead, one or more uncombined replay segments are transmitted to one or more client devices 740A-C. For example, as discussed above, in some cases, the requestor of the replay segment may specify that only certain devices provide replay segment data.

Figure 8:
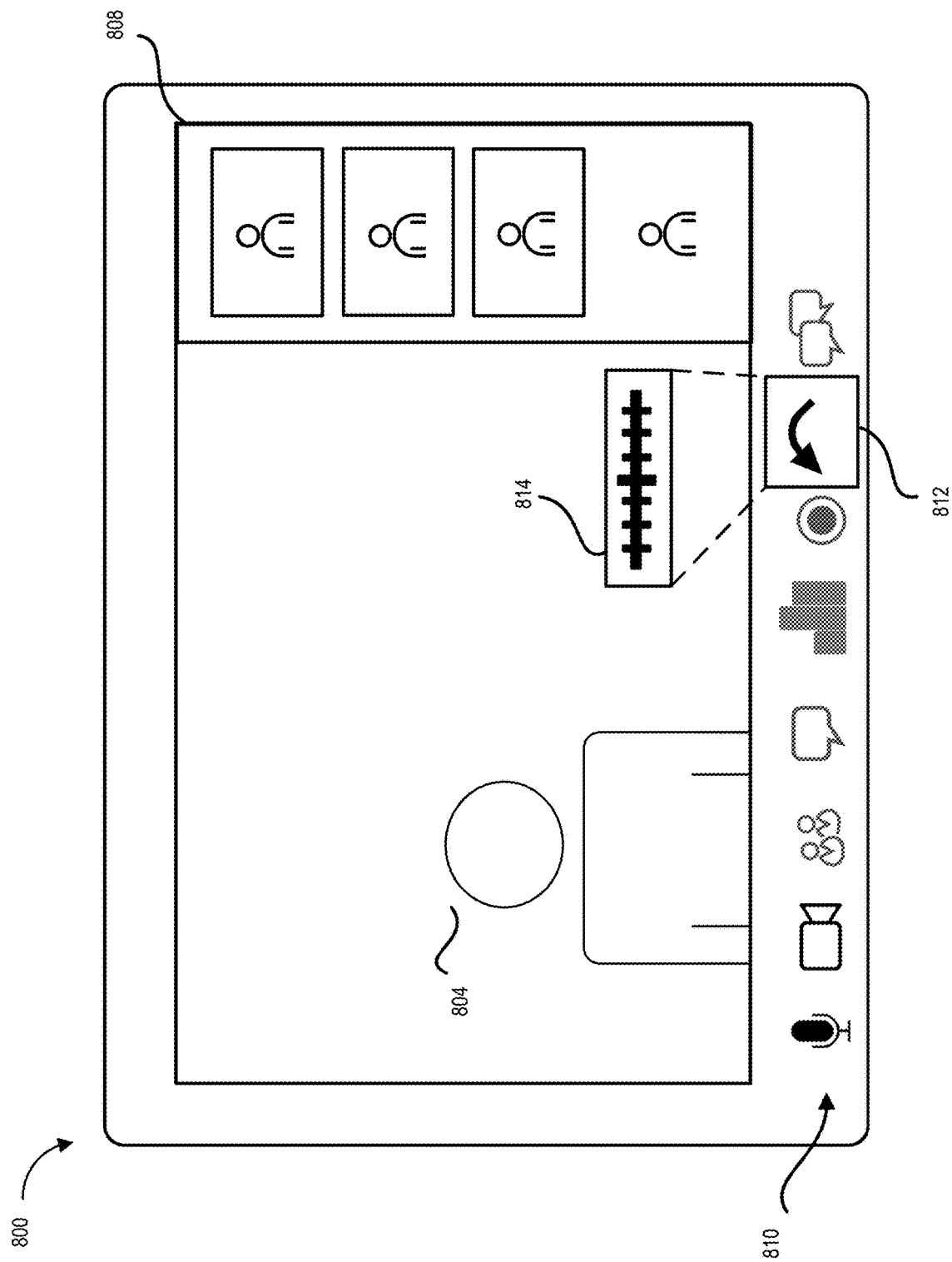
FIG. 8 depicts an example of a Graphical User Interface (GUI) of a video conference including instant replay functionality.

FIG. 8 depicts an example of a Graphical User Interface (GUI) of a video conference including instant replay functionality. GUI 800 can be used on any client device for viewing and/or controlling the video conference. GUI 800 depicts participant 804, indication 808, and conference controls 810. Participant 804 is a currently-selected participant, which can be a participant corresponding to the client device on which GUI 800 is displayed, or another selected participant, for instance, the participant that is currently active or speaking. Indication 808 depicts different conference participants. Conference controls 810 include replay button 812, which activates the instant replay function. In some cases, slider 814 is displayed to allow finer-grain control of the start and/or duration of the instant replay. Further, after the replay has been received, the control can allow the user to scrub through the replay as desired to review portions of interest.

Figure 9:
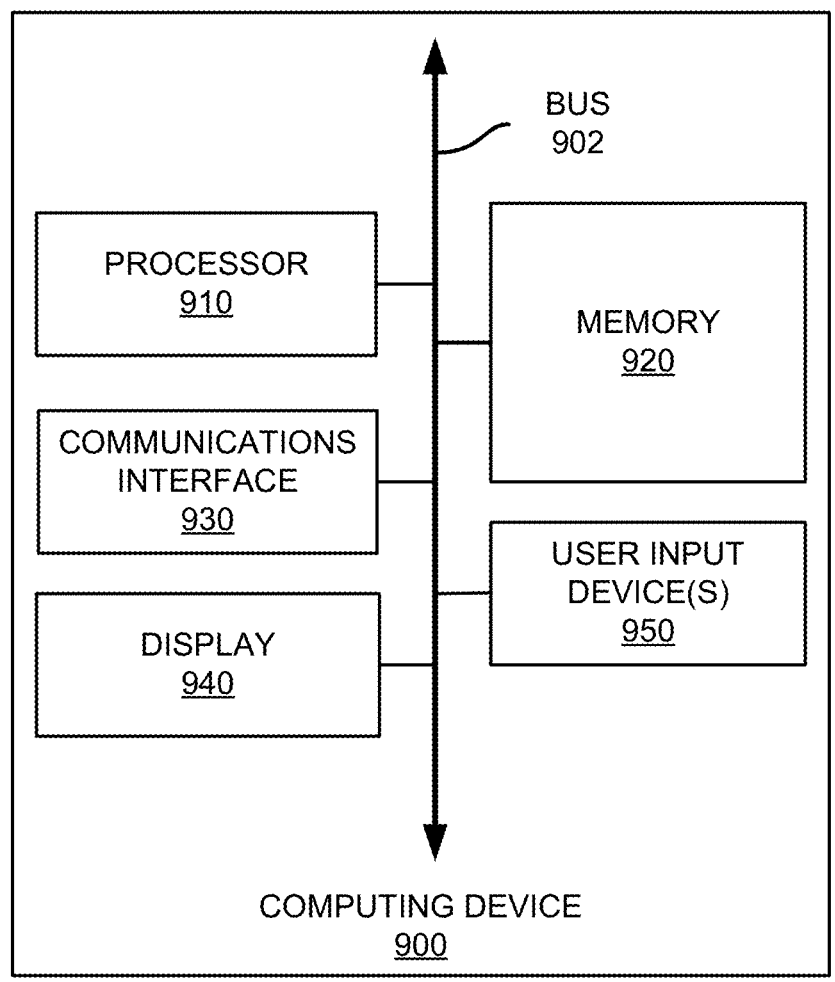
FIG. 9 illustrates an example computing device for providing instant replay functionality.

FIG. 9 illustrates an example computing device for providing instant replay functionality. Computing device 900 is suitable for use in example systems or methods described herein. Computing device 900 includes a processor 910 which is in communication with the memory 920 and other components of the computing device 900 using one or more communications buses 902.

The processor 910 is configured to execute processor-executable instructions stored in the memory 920 to perform one or more methods described herein, such as part or all of the method, described above. The computing device, in this example, also includes one or more user input devices 950, such as a keyboard, mouse, touchscreen, video input device (e.g., one or more cameras), microphone, etc., to accept user input. The computing device 900 also includes a display 940 to provide visual output to a user.

The computing device 900 also includes a communications interface 930. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Illustration 1 is a method comprising: receiving, by a virtual conference provider from a first client device of a plurality of client devices connected to a virtual meeting, a request for a replay segment from a second client device of the plurality of client devices; transmitting, to the second client device during the virtual meeting, the request for the replay segment; receiving, from the second client device during the virtual meeting, replay segment data from the second client device, the replay segment data comprising data recorded by the second client device during the virtual meeting; and transmitting, to the first client device, the replay segment data.

Illustration 2 is the method of any previous or subsequent illustration, further comprising: receiving, from the first client device during the virtual meeting, additional replay segment data from the first client device, the replay segment data comprising data recorded by the first client device during the virtual meeting; combining the replay segment data with the additional replay segment data; and transmitting the combined segment to one or more of the plurality of client devices.

Illustration 3 is the method of any previous or subsequent illustration, further comprising transmitting the replay segment data to a third client device of the plurality of client devices.

Illustration 4 is the method of any previous or subsequent illustration, further comprising: establishing, via the virtual conference provider, the virtual meeting and joining the plurality of client devices to the virtual meeting, each client device associated with a corresponding participant; and receiving, from one or more of the client devices, replay opt-in information for participants in the virtual meeting.

Illustration 5 is the method of any previous or subsequent illustration, wherein the data comprises one or more of audio, video, screenshare data, and messaging data corresponding to one or more client devices of the plurality of client devices.

Illustration 6 is the method of any previous or subsequent illustration, further comprising: transmitting, to one or more of the plurality of client devices, a request for consent for recording of a respective replay segment; and receiving, from the second client device, an approval to the request for consent.

Illustration 7 is the method of any previous or subsequent illustration, wherein the request for replay segment comprises a start time and a duration, and wherein the replay segment data corresponds to the start time and the duration.

The above examples may be implemented on a system including a processor and/or on a non-transitory computer-readable medium. These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

That which is claimed is:

1. A method comprising:
receiving, by a virtual conference provider from a first client device of a plurality of client devices connected to a virtual meeting, a request for a replay segment from a second client device of the plurality of client devices, the request indicating a type of replay segment, the second client device maintaining a plurality of buffers, each buffer comprising a different type of virtual meeting data;
transmitting, to the second client device during the virtual meeting, the request for the replay segment;
receiving, from the second client device during the virtual meeting, replay segment data from the second client device, the replay segment data comprising the requested type of data recorded by the second client device during the virtual meeting, the replay segment data comprising replay data corresponding to participants in the virtual conference who have consented to recording of the requested type of data; and
transmitting, to the first client device, the replay segment data.

2. The method of claim 1, further comprising:
receiving, from the first client device during the virtual meeting, additional replay segment data from the first client device, the additional replay segment data comprising data recorded by the first client device during the virtual meeting;
combining the replay segment data with the additional replay segment data; and
transmitting the combined segment to one or more of the plurality of client devices.

3. The method of claim 1, further comprising transmitting the replay segment data to an additional client device that is not one of the plurality of client devices.

4. The method of claim 1, further comprising:
establishing, via the virtual conference provider, the virtual meeting and joining the plurality of client devices to the virtual meeting, each client device associated with a corresponding participant; and receiving, from one or more of the client devices, replay opt-in information for participants in the virtual meeting.

5. The method of claim 1, wherein the data recorded by the second client device during the virtual meeting comprises one or more of audio, video, screenshare data, and messaging data corresponding to one or more client devices of the plurality of client devices.

6. The method of claim 1, further comprising:
transmitting, to one or more of the plurality of client devices, a request for consent for recording of a respective replay segment; and
receiving, from the second client device, an approval to the request for consent.

7. The method of claim 1, wherein the request for the replay segment comprises a start time and a duration, and wherein the replay segment data corresponds to the start time and the duration.

8. A system comprising:
a non-transitory computer-readable medium storing processor-executable program instructions; and
one or more processors communicatively coupled to the non-transitory computer-readable medium, the one or more processors configured to execute computer-executable program instructions to:
receive, by a virtual conference provider from a first client device of a plurality of client devices connected to a virtual meeting, a request for a replay segment from a second client device of the plurality of client devices, the request indicating a type of replay segment, the second client device maintaining a plurality of buffers, each buffer comprising a different type of virtual meeting data;
transmit, to the second client device during the virtual meeting, the request for the replay segment;
receive, from the second client device during the virtual meeting, replay segment data from the second client device, the replay segment data comprising the requested type of data recorded by the second client device during the virtual meeting, the replay segment data comprising replay data corresponding to participants in the virtual conference who have consented to recording of the requested type of data; and
transmit, to the first client device, the replay segment data.

9. The system of claim 8, wherein the one or more processors are configured to execute further computer-executable program instructions stored in the non-transitory computer-readable medium to:
receive, from the first client device during the virtual meeting, additional replay segment data from the first client device, the additional replay segment data comprising data recorded by the first client device during the virtual meeting;
combine the replay segment data with the additional replay segment data; and
transmit the combined segment to one or more of the plurality of client devices.

10. The system of claim 9, wherein the one or more processors are configured to execute further computer-executable program instructions stored in the non-transitory computer-readable medium to: transmit the replay segment data to an additional client device that is not one of the plurality of client devices.

11. The system of claim 8, wherein the one or more processors are configured to execute further computer-executable program instructions stored in the non-transitory computer-readable medium to:
establish, via the virtual conference provider, the virtual meeting and joining the plurality of client devices to the virtual meeting, each client device associated with a corresponding participant; and
receive, from one or more of the client devices, replay opt-in information for participants in the virtual meeting.

12. The system of claim 8, wherein the data recorded by the second client device during the virtual meeting comprises one or more of audio, video, screenshare data, and messaging data corresponding to one or more client devices of the plurality of client devices.

13. The system of claim 8, wherein the one or more processors are configured to execute further computer-executable program instructions stored in the non-transitory computer-readable medium to:
transmit, to one or more of the plurality of client devices, a request for consent for recording of a respective replay segment; and
receive, from the second client device, an approval to the request for consent.

14. The system of claim 8, wherein the request for the replay segment comprises a start time and a duration, and wherein the replay segment data corresponds to the start time and the duration.

15. A non-transitory computer-readable medium comprising computer-executable instructions configured to cause one or more processors to:
receive, by a virtual conference provider from a first client device of a plurality of client devices connected to a virtual meeting, a request for a replay segment from a second client device of the plurality of client devices, the request indicating a type of replay segment, the second client device maintaining a plurality of buffers, each buffer comprising a different type of virtual meeting data;
transmit, to the second client device during the virtual meeting, the request for the replay segment;
receive, from the second client device during the virtual meeting, replay segment data from the second client device, the replay segment data comprising the requested type of data recorded by the second client device during the virtual meeting, the replay segment data comprising replay data corresponding to participants in the virtual conference who have consented to recording of the requested type of data; and
transmit, to the first client device, the replay segment data.

16. The non-transitory computer-readable medium of claim 15, further comprising computer-executable instructions configured to cause the one or more processors to:
receive, from the first client device during the virtual meeting, additional replay segment data from the first client device, the additional replay segment data comprising data recorded by the first client device during the virtual meeting;
combine the replay segment data with the additional replay segment data; and
transmit the combined segment to one or more of the plurality of client devices.

17. The non-transitory computer-readable medium of claim 16, further comprising computer-executable instructions configured to cause the one or more processors to transmit the replay segment data to a third client device of the plurality of client devices.

18. The non-transitory computer-readable medium of claim 15, further comprising computer-executable instructions configured to cause the one or more processors to:
- establish, via the virtual conference provider, the virtual meeting and joining the plurality of client devices to the virtual meeting, each client device associated with a corresponding participant; and
- receive, from one or more of the client devices, replay opt-in information for participants in the virtual meeting.

19. The non-transitory computer-readable medium of claim 15, wherein the data recorded by the second client device during the virtual meeting comprises one or more of audio, video, screenshare data, and messaging data corresponding to one or more client devices of the plurality of client devices.

20. The non-transitory computer-readable medium of claim 15, further comprising computer-executable instructions configured to cause the one or more processors to:
- transmit, to one or more of the plurality of client devices, a request for consent for recording of a respective replay segment; and
- receive, from the second client device, an approval to the request for consent.

21. The method of claim 1, wherein the replay segment captured in a circular buffer by the second client device.

* * * * *